US008566951B2

(12) United States Patent
Horiuchi et al.

(10) Patent No.: US 8,566,951 B2
(45) Date of Patent: Oct. 22, 2013

(54) APPARATUS AND METHODS FOR SETTING SECURITY TO STORAGE UNIT AND COMPUTER

(75) Inventors: Yasuhiro Horiuchi, Yamato (JP); Kohsuke Ohtani, Tokyo-to (JP); Kazunobu Umeda, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1069 days.

(21) Appl. No.: 12/110,279

(22) Filed: Apr. 25, 2008

(65) Prior Publication Data

US 2008/0276059 A1 Nov. 6, 2008

(30) Foreign Application Priority Data

Apr. 26, 2007 (JP) .................... 2007-117618

(51) Int. Cl.
*G06F 7/04* (2006.01)
(52) U.S. Cl.
USPC .......................................................... 726/27
(58) Field of Classification Search
USPC .................... 713/1, 2; 726/5, 18, 27
See application file for complete search history.

(56) References Cited

U.S. PATENT DOCUMENTS

| 5,432,950 | A * | 7/1995 | Sibigtroth ............... 711/163 |
| 7,350,067 | B2 * | 3/2008 | Spottswood .................. 713/1 |
| 7,818,789 | B2 * | 10/2010 | Beilinson et al. ............... 726/4 |
| 2003/0009697 | A1 * | 1/2003 | Uehata et al. ................. 713/201 |
| 2006/0070123 | A1 * | 3/2006 | Camilli ........................... 726/16 |
| 2007/0271597 | A1 * | 11/2007 | Venkatachalam et al. ........ 726/4 |
| 2008/0083037 | A1 * | 4/2008 | Kruse et al. ..................... 726/27 |
| 2009/0216979 | A1 * | 8/2009 | Balasubramanian et al. 711/163 |

FOREIGN PATENT DOCUMENTS

| JP | 2002-251324 | 6/2002 |
| JP | 2003-233538 | 8/2003 |
| JP | 2004-047041 | 2/2004 |
| JP | 2006-309296 | 9/2006 |
| JP | 2007-012123 | 1/2007 |
| JP | 2007-207352 | 8/2007 |

* cited by examiner

*Primary Examiner* — Peter Shaw
(74) *Attorney, Agent, or Firm* — Ference & Associates LLC (57) ABSTRACT

Methods and apparatus are provided for inhibiting data writing to an optical disc drive connected to a computer. A BIOS confirms presence of a security function of an optical disc drive. When the optical disc drive possesses the security function, the BIOS delivers a command to the optical disc drive to set it to a read-only mode. The optical disc drive that has received the command sets the drive per se to operate in the read-only mode. Since a command for setting it to the read-only mode and a command for releasing it are delivered to the optical disc drive only by the BIOS, when a control is transferred to an Operating System (OS), setting of the read-only mode cannot be released by the OS and other OS's, or application software.

16 Claims, 5 Drawing Sheets

APPARATUS AND METHODS FOR SETTING SECURITY TO STORAGE UNIT AND COMPUTER

CLAIM FOR PRIORITY

This application claims priority from Japanese Patent Application No. 2007-117618, filed Apr. 26, 2007, and which is hereby incorporated by reference as if fully set forth herein.

FIELD OF THE INVENTION

The present invention generally relates to a technology for setting security to a storage unit, and more particularly, relates to a technology for inhibiting writing of data from a computer to a writable storage unit or units.

BACKGROUND OF THE INVENTION

An optical disc is a generic nomenclature of disc-shaped storage media in which data are read/written using laser light. Among optical discs, presently, although CDs, DVDs, or the like are generally used, next-generation discs such as Blue-ray Discs (hereinafter referred to as "BD" for the simplicity sake) or HD-DVDs have begun to appear on the market. These optical discs are used as not only a data medium for storing data of computers but also as a medium allowing recording and reproduction of music videos in exclusive devices. An optical disc drive is a storage unit that rotates an optical disc to read/write data from/to the optical disc. In personal computers (hereinafter, simply referred to as "PC"), regardless of their type such as a desktop or a notebook, optical disc drives are mounted on most of the products.

Optical discs are similar in their external appearance but are manufactured according to various different standards and thus often cause user confusion when using them. With regard to data medium alone, CDs, DVDs, BDs and HD-DVDs can be classified into various categories: read-only ones; once-writable ones; plural-times-rewritable ones; and so forth. To meet these many standards, there exist many types of optical disc drives. As typical types of optical disc drive, there are a CD-ROM drive in which data can only be read from CDs, a DVD-ROM drive in which data can be read from CDs and DVDs, a combo drive in which data can be read from CDs and DVDs but cannot be written to DVDs, and a super-multi drive in which data can be read/written from/to CDs and DVDs. Particularly, optical disc drives such as the combo drive and the super-multi drive, in which data writing is possible, are becoming popular in recent years. Included next-generation standards such as BD or HD-DVD in the above-mentioned ones, the number of types of the optical disc drives will much more increase.

Now, known technologies for allowing read-only access from a computer to a storage unit in which data can be read/written will be described. According to a technology taught in Japanese Laid-open (Kokai) Patent Publication No. 2006-309296, a BIOS confirms settings on permission/non-permission to use a storage unit, which is set by a supervisor, during startup of a computer, and based on the permission settings confirmed, initialization of the storage unit is inhibited, thereby restricting the use thereof. Also taught is a technology for restricting writing of data to the storage unit by using a filter driver during a control by an operating system (hereinafter, simply referred to as "OS"). According to a technology taught in Japanese Laid-open (Kokai) Patent Publication No. 2004-047041, a write protection unit is provided between a computer and a magnetic disc drive to set the magnetic disc drive to a write inhibit mode. According to a technology taught in Japanese Laid-open (Kokai) Patent Publication No. 2002-251324, a disc drive switches its mode by a switch operation between a writable mode and a non-writable mode. According to a technology taught in Japanese Laid-open (Kokai) Patent Publication No. 2007-012123, by forcibly erasing a portion of flash memory areas by a process of firmware, a write function of an optical disc drive is invalidated so that the optical disc drive is used only for reading.

As described above, with the popularization of optical disc drives in which data can be read/written (such feature hereinafter referred to as "rewritable"), manufacturers of the optical disc drives are stopping manufacturing of read-only optical disc drives, in which only date reading is possible, in order to cut down the number of components or products and to thus get the cost down. For this reason, only the rewritable optical disc drives are put into the market and thus it has become difficult to buy a read-only optical disc drive.

Further, to meet the various optical disc standards described above, there are many types of optical disc drives. Whenever a new optical disc standard is developed, the types of the optical disc drives will increase much more. Therefore, the PC makers need to decrease the number of types of components stored for manufacture and maintenance as much as possible to make component management easy or get the cost down. For this reason, many PC makers are not holding such read-only optical disc drives as components.

However, it cannot be said that such read-only optical disc drives have become completely unnecessary. For example, corporate or public authority users are reinforcing their security management to prevent illegal leaks of massive personal or confidential information handled in their businesses. As an example of the route of the information leaks, a user may remove a recording medium, in which data are written using a rewritable storage unit, from a PC and take the medium to the outside. To prevent this, the corporate or public authority users may sometimes need to order special PCs for business use in which storage units, such as an optical disc drive, in which a recording medium is removable from the PCs solely or along with a storage unit, are configured for read-only use. The PC makers therefore need to make PCs having a read-only storage unit mounted therein in order to meet such needs.

To cope with such problems, a method can be considered in which a rewritable optical disc drive is incorporated in a PC and configured for read-only use before shipping the PC. According to the technology of Japanese Laid-open (Kokai) Patent Publication No. 2006-309296, under the control of OS, a device driver restricts sending a write command from a PC to a rewritable optical disc drive which cannot be set for a read-only mode, whereby the optical disc drive is substantially treated as being configured for read-only use. However, among application software operated by an OS such as WINDOWS (registered trademark), some software can perform direct data access to an optical disc drive without a device driver that the OS provides to the application software. In such a case, even when the technology of Japanese Laid-open (Kokai) Patent Publication No. 2006-309296 is employed, there is a risk that a write command is directly sent from the application software to the optical disc drive without intervention of the device driver.

In addition, by using FLOPPY (registered trademark) discs, CD-ROMs, externally attached hard disk drives (hereinafter, simply referred to as "HDD"), and the like, a user can install and load another OS different from the OS normally installed in a built-in HDD of a PC. However, when the technology of Japanese Laid-open (Kokai) Patent Publication No. 2006-309296 is employed, a user can start up a device driver included in another OS, different from the device driver configured to prevent sending of a write command; therefore, the sending of a write command is not restricted.

Meanwhile, an optical disc drive according to the technology of Japanese Laid-open (Kokai) Patent Publication No. 2007-012123 forcibly interrupts a write function of an originally rewritable optical disc drive and sets the optical disc drive to operate in a read-only mode. When such an optical disc drive is mounted in a PC, usually, an OS sends a command to the optical disc drive to set it to a read-only mode and the optical disc drive executes the command to operate in the read-only mode. However, even in such a case, there is a possibility that a command for canceling or changing the read-only mode can be sent from application software capable of direct data access to the optical disc drive without intervention of a device driver. Also, a case can be assumed such that another unexpected OS is installed and put into operation to prevent a command for setting a read-only mode in an optical disc drive from being sent to the optical disc drive or to send a command for canceling or changing the read-only mode to the optical disc drive, whereby a successful read-only mode operation is not ensured.

In addition, when a user removes an optical disc drive that can be set to a read-only mode from a PC in which the optical disc drive was originally mounted and attaches to the PC a rewritable optical disc drive that cannot be set for the read-only mode, the optical disc drive will not execute the command from an OS for setting the optical disc drive for the read-only mode, whereby a successful read-only mode operation is not ensured. Particularly, most of today's PCs have a swappable bay that allows attachment, removal, or replacement of peripheral devices such as an optical disc drive in a state where a PC is powered on and an OS is operating. When an optical disc drive is removably connected to a PC by the swappable bay, since it is easy to replace the optical disc drive, there is a high risk that a rewritable optical disc drive that cannot be set to a read-only mode is attached to the PC in a state where the optical disc drive can operate.

As discussed above, according to the method known in the art, it is practically impossible to ensure security even when one tries to operate a rewritable optical disc drive in a read-only mode. From the perspective of preventing information leaks, a method can be considered in which attachment of another optical disc drive to a PC is inhibited or an interface used to connect an optical disc drive to a PC is disabled. However, such a method would inhibit installation of verified application software used in business or even inspection of data and as a result, would harm the convenience of users. The same problem can occur, without limiting to the optical disc drives, in most rewritable storage units such as a hard disc drive or a semiconductor storage unit, which can be removably attached to or incorporated in PCs.

A need has arisen, therefore, to provide a method for securely permitting a computer to set security to a storage unit from/to which data can be read/written. There is also a need to provide a computer capable of performing such a security setting. There is further a need to provide a computer program (BIOS) product that permits a computer to perform such setting.

SUMMARY OF THE INVENTION

In summary, one aspect of the present invention provides a method comprising: setting a security for a data storage unit, said setting further comprising: confirming the presence of a security function of the data storage unit by a BIOS of an apparatus in a state where a control by an operating system of the apparatus is not being performed; when it is determined that the storage unit has the security function, setting the security on the data storage unit by the BIOS; and transferring the control from the BIOS to the operating system wherein the security setting is maintained.

Another aspect of the present invention provides a method comprising: directing an apparatus to securely set a data storage unit to a read-only mode, said directing further comprising: permitting execution of an operating system; detecting that the data storage device is connected to the apparatus during the execution of the operating system; transferring a control of the apparatus from the operating system to a BIOS in response to said detecting; setting the data storage device to the read-only mode by the BIOS; and transferring the control from the BIOS to the operating system wherein the state of being set to the read-only mode is maintained.

Another aspect of the present invention provides an apparatus comprising: a recording medium that stores an operating system; a nonvolatile memory that stores a BIOS; a processor capable of switching between and execution of the operating system and the BIOS; a connecting portion which establishes a removable connection between a storage unit and the apparatus; and a storage section capable of storing setting information for the storage unit; wherein, when it is determined that the storage unit is connected to the connecting portion and has a security function, the processor executes the BIOS and sets the storage unit to a read-only mode.

Another aspect of the present invention provides a tangible program storage device readable by machine, tangibly embodying a program of instructions executable by the machine to perform method steps, said method steps comprising: directing a BIOS to control a process of setting a security for a storage unit, wherein said storage unit can be set to a read-only mode and reversibly connected to an apparatus, said process of setting a security further comprising: confirming if it is possible to set the storage unit to the read-only mode; referring to setting information stored on the apparatus; and when it is determined that the storage unit can be set to the read-only mode, setting the storage unit to the read-only mode based on the setting information.

For a better understanding of the present invention, together with other and further features and advantages thereof, reference is made to the following description, taken in conjunction with the accompanying drawings, and the scope of the invention that will be pointed out in the appended claims.

BRIEF DESCRIPTION OF THE DRAWINGS

FIG. 5 is a flow chart illustrating processes performed when an optical disc drive is attached to a notebook PC and the notebook PC is powered on;

DETAILED DESCRIPTION OF THE PREFERRED EMBODIMENTS

The disclosure will now provide a general overview of the invention followed by a more detailed description of the invention and preferred embodiments with reference to the figures. It is to be understood that the present invention, in accordance with at least one presently preferred embodiment, as generally described and illustrated in the Figures herein, may be arranged and designed in a wide variety of different configurations. Thus, the following more detailed description of the embodiments of the methods of the present invention, as represented in the Figures, is not intended to limit the scope of the invention, as claimed, but is merely representative of selected embodiments of the invention. Although illustrative embodiments of the present invention have been described herein with reference to the accompanying Figures, it is to be understood that the invention is not limited to those precise embodiments, and that various other changes and modifications may be affected by one skilled in the art without departing from the scope or spirit of the invention.

According to one embodiment of the present invention, there is provided a method for permitting a computer to set security to a storage unit from/to which data can be read/written. In the setting method, a computer executes a BIOS to confirm presence of a security function of a storage unit. The security function means a function that urges a storage unit to operate in accordance with a security setting process of the present invention. For example, the security function may be configured such that when a storage unit receives a specific command from a computer, the function may force the storage unit per se either to operate in a read-only mode or to cancel or change the read-only mode. When the storage unit possesses the security function, the BIOS carries out setting of security to the storage unit. And, the setting by the BIOS is maintained so that the security with regard to the storage unit is ensured even when a control is transferred to the OS.

According to an embodiment of the present invention, since the security setting of the storage unit is performed only by the BIOS, the security setting once preset cannot be cancelled or changed by an application software directly accessing the storage unit or by starting another OS. Since replacement of the BIOS can be enabled only by computer makers or a supervisor knowing a supervisor password, or when replaced integral with a nonvolatile memory, the operation of a computer can be disabled, it would be difficult for general users to cancel or change the security setting of the storage unit. When the setting of security is performed during execution of a POST (Power-On Self Test) after startup of a computer, it is possible to ensure the security of the storage unit whenever starting of the computer is carried out.

When the storage unit receives a specific command regarding setting of security but does not execute the command at any time after the end of a predetermined period after an initialization command has been received during execution of a POST, it is possible to mitigate or reduce a risk that the specific command is intercepted and altered and the security is canceled or changed. When the BIOS acquires unique information of the storage unit and encodes the specific command regarding the security using the unique information, it is possible to reduce the possibility that the specific command is intercepted and altered in the course of being sent from a computer to the storage unit or that someone removes the storage unit from the PC by disassembling and takes the storage unit to the outside.

The computer may be provided with setting information including a setting wherein access to the storage unit is completely restricted; a setting wherein access to the storage unit is not restricted at all; and a setting wherein access to the storage unit is set to a read-only mode. Then, the BIOS can flexibly select the setting method of security on the storage unit by using the setting information. For instance, when the storage unit has the security function, the BIOS can invalidate the input/output port of the computer in association with the storage unit or set the storage unit to a read-only mode or a mode wherein access to the storage unit from the computer is not restricted. On the other hand, when the storage unit does not have the security function, the BIOS can invalidate the input/output port of the computer in association with the storage unit or set the storage unit to a mode wherein access to the storage unit from the computer is not restricted.

In accordance with an embodiment of the present invention, there is provided a security setting method when a storage unit is connected to a computer in a state where the computer is executing an OS. When it is detected that the storage unit is connected to the computer during execution of the OS, a control is transferred from the OS to a BIOS. Then, the BIOS sets the storage unit to a read-only mode and the control is transferred from the BIOS to the OS while maintaining the state of being set to the read-only mode, whereby it is possible to securely perform the security setting by the BIOS.

In accordance with an embodiment of the present invention, there is provided a computer to which a readable and writable storage unit, from/to which data can be read/written and which has a security function, can be attached. The computer includes a recording medium that stores therein an operating system (an OS); a nonvolatile memory that stores therein a BIOS; a processor capable of switching and executing the OS and the BIOS; a connecting portion that performs a removable connection of the storage unit; and a storage section capable of storing setting information on security in the storage unit. When it is determined that the storage unit connected to the connecting portion possesses a security function, the processor executes the BIOS and sets the storage unit to the read-only mode. The storage unit may be an optical disc drive, a hard disc drive or a semiconductor storage unit. The connection portion may connect the storage unit to the computer via an interface standardized by any one of IDE, USB, PCMCIA, CardBus, miniPCI, and Express Card.

The present invention is particularly suitable when the driving portion of the storage unit is connected to the computer via a connector or an optical communication and is physically removed or detached from the computer along with the recording medium or when the storage unit itself is fixed to the computer and only the recording medium is removed from the storage unit. When it is detected that the storage unit is connected to the connecting portion in a state where the OS is being in operation, the processor may acquire an SMI and a control is transferred from the OS to the BIOS, whereby the storage unit is set to the read-only mode. With this configuration, a storage unit which is connected in a hot swappable manner during operation of the OS can be set to a read-only mode and operated in that mode. In accordance with a fourth aspect of the present invention, there is provided a BIOS for permitting a computer to implement the above-described security setting function.

In accordance with the above-mentioned diverse aspects of the present invention, it is possible to provide a method for permitting a computer to set security to a readable and writable storage unit from/to which data can be read/written. Further, it is possible to provide a computer capable of performing such security setting. Furthermore, it is possible to provide a computer program (BIOS) product that permits a computer to perform such setting.

Figure 1:
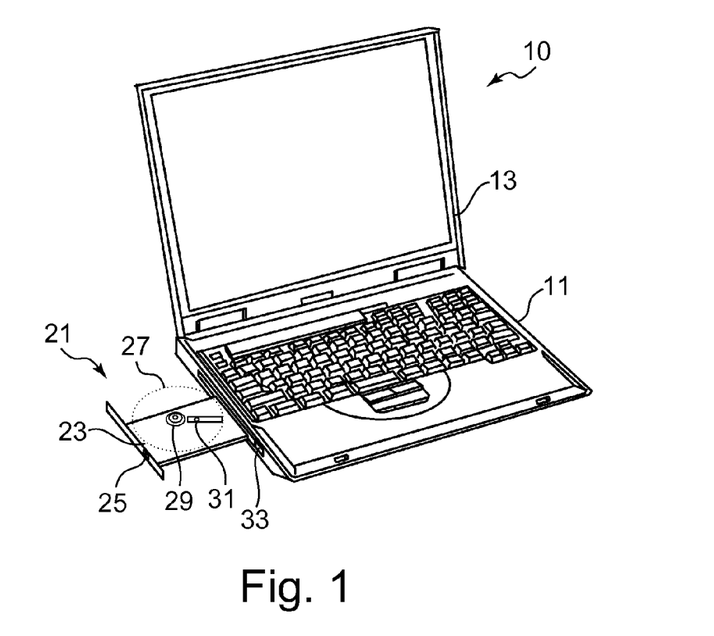
FIG. 1 is a perspective diagram showing the external view of a notebook PC according to an embodiment of the present invention.

Referring now to the figures, FIG. 1 is a perspective view illustrating the external view and configuration of a notebook PC (hereinafter, simply referred to as "notebook PC") 10 according to an embodiment of the present invention. The notebook PC 10 includes a case 11 in which a keyboard and a pointing device are mounted on the surface and many devices are accommodated therein and a cover portion 13 in which a liquid crystal display (LCD) is mounted on the surface. An optical disc drive 21 is mounted on the lateral surface of the case 11. The optical disc drive 21 has a tray 23 that can be opened, and an eject button 25 is provided to the tray 23 so as to be exposed to the lateral surface of the case 11. When a user presses the eject button 25, the tray 23 is pushed forward from the lateral surface of the case 11. In the optical disc drive 21, in order to save space, a spindle 29 and a pickup 31 are attached to the tray 23 side. When a user inserts and sets an optical disc 27 on the tray 23 so that the center of the disc is fitted to the spindle 29 and pushes the tray 23 pushed forward from the lateral surface of the case 11 back to the inside of the case 11, the spindle 29 starts rotating and the pickup 31 reciprocates in a direction from the center to the periphery of the optical disc 27 and vice versa. Accordingly, the optical disc drive 21 can read/write data from/to the optical disc 27.

The optical disc drive 21 is attached to the notebook PC 10 via a swappable bay. The swappable bay corresponds to a hot swap that performs attachment, removal and replacement of devices in a state where an OS is operating in the notebook PC 10 and to a warm swap that performs attachment, removal and replacement of devices in a state where the operation of the notebook PC 10 is suspended. By moving a removal lever 33 of the swappable bay, the optical disc drive 21 can be removed from the notebook PC 10. The removal lever 33 is a lever for physically separating the optical disc drive 21 from an interface and includes a switch (not shown) for detecting an operation for attachment or removal of the optical disc drive 21 and causing software to perform a process corresponding to the operation.

Figure 2:
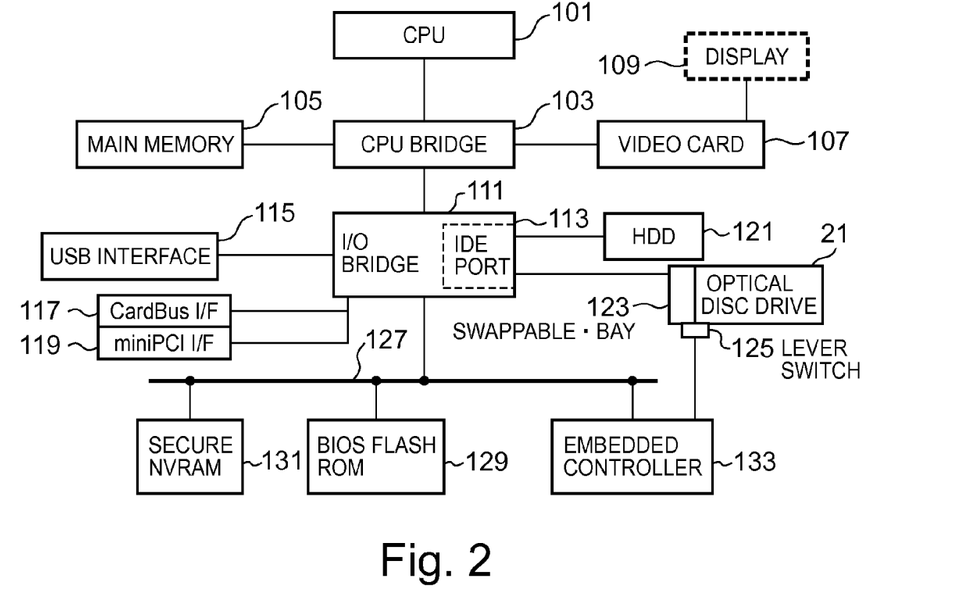
FIG. 2 is a block diagram showing an outlined hardware configuration of the notebook PC according to an embodiment of the present invention.

FIG. 2 is a block diagram showing a schematic hardware configuration of the notebook PC 10. A CPU 101 is an arithmetic-processing unit for performing a main function of the notebook PC 10 and executes an OS, a BIOS, a device driver, or an application program. The CPU 101 can be operated in an SMM (System Management Mode) which is a privileged execution mode for system management when an SMI (System Management Interrupt) input pin (SMI#) is asserted. The CPU 101 operating in SMM can execute operations mainly relating to security, suspend, resume and power management under the control of the BIOS.

A CPU bridge 103 is configured to perform functions including a memory controller function for controlling access to a main memory 105 and a data buffer function for absorbing difference in data transmission speed between connected devices. The main memory 105 is a writable memory used as a read area from which programs executed by the CPU 101 are read and a work area to which processing data are written. The main memory 105 also includes an area as an SMRAM (System Management RAM), which will be described later. A video card 107 has a video chip (not shown) and a VRAM (not shown). The video card 107 receives rendering commands from the CPU 101, generates images to be rendered, and writes the images to the VRAM. The images read from the VRAM are sent to a display 109 as rendering data.

An I/O bridge 111 similar to the CPU bridge 103 is provided as a device controller which constitutes a chip set. The I/O bridge 111 incorporates therein an IDE port 113 having an IDE (Integrated Device Electronics) interface function. The I/O bridge 111 can be connected to various peripheral devices in compliance with the USB standards via a USB interface 115. The various peripheral devices as used herein include storage units such as an optical disc drive, a hard disc drive or a semiconductor storage unit, which are externally attached. Also, storage units in compliance with respective standards can be connected via a CardBus interface 117 and a miniPCI interface 119.

To the IDE port 113, an HDD 121 in compliance with ATA (Advanced Technology Attachment) or serial ATA and an optical disc drive 21 which is compliant with ATAPI (ATA Packet Interface) are connected. The HDD 121 has installed therein an OS, a device driver, an application program, and the like. The optical disc drive 21 is connected to the IDE port 113 via a swappable bay 123. The swappable bay 123 includes a lever switch 125 that opens/closes when a user moves the removal lever 33 to attach/remove a device to/from the bay, details of which will be described later.

The I/O bridge 111 is connected to a device that does not require high-speed data transmission via an LPC bus 127. The LPC bus 127 is connected to a BIOS flash ROM 129, a secure NVRAM (Non-Volatile RAM) 131, and an embedded controller 133. The BIOS flash ROM 129 and the secure NVRAM 131 will be described later.

The embedded controller 133 is a micro computer configured by 8 through 16 bits CPU, a ROM and a RAM, and includes A/D input terminals and D/A output terminals for a plurality of channels, a timer, and digital input/output terminals. A cooling fan (not shown), a temperature sensor (not shown) and a power controller for controlling a power supply unit are connected to the embedded controller 133 via the input/output terminals. A program for managing the operating environment inside the PC can be executed independently of the CPU 101. The lever switch 125 of the swappable bay 123 is also connected to the embedded controller 133. The embedded controller 133 detects the opening/closing of the lever switch 125 to thereby detect the attachment/removal of devices to/from the swappable bay 123. The embedded controller 133 can also make an assertion of the SMI# of the CPU 101 to thereby operate the CPU 101 in the SMM and can execute management of the supply of power to the device connected the swappable bay 123.

It is to be understood that FIG. 2 only illustrates the primary hardware configuration related to an embodiment and the connections in order to describe the embodiment. In addition to the components described above, many other devices such as a wired LAN adapter, a wireless LAN adapter, a power supply unit, an I/O controller, or an input/output device such as a keyboard or a mouse are employed for the constitution of the notebook PC 10. However, since these are well known to one having ordinary skill in the art, detailed explanations for them will not be provided here. Of course, a plurality of blocks shown in FIG. 2 may form a single integrated circuit or device, or one block may be divided into a plurality of integrated circuits or devices, and these configurations are also included within the scope of the present invention, so long as one having ordinary skill in the art can arbitrarily select the configurations.

Figure 3:
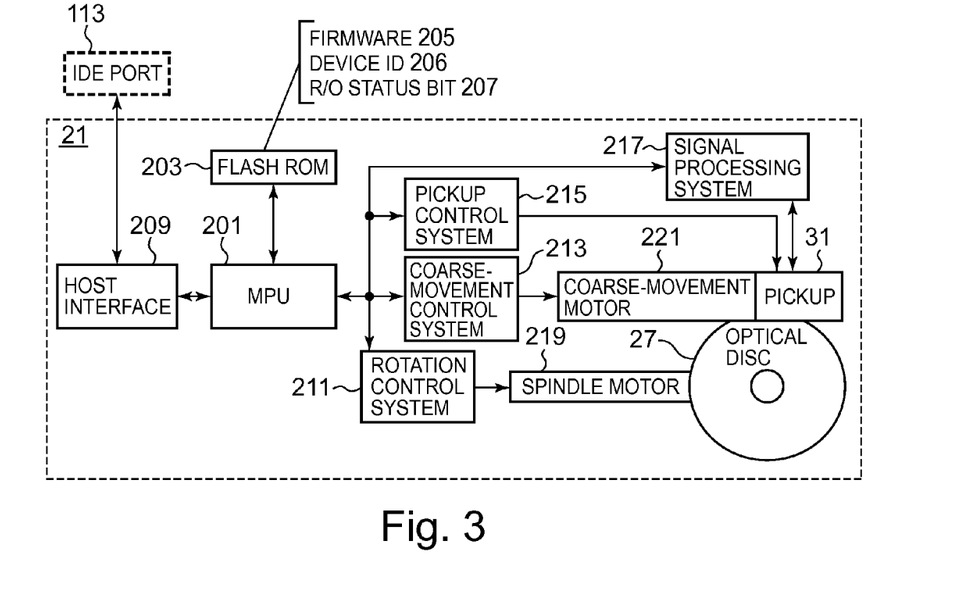
FIG. 3 is a block diagram showing an outlined internal configuration of an optical disc drive according to an embodiment of the present invention.

FIG. 3 is a block diagram illustrating a schematic internal configuration of the optical disc drive 21. Within the optical disc drive 21, an MPU (Micro Processing Unit) 201 executes firmware 205 stored in a flash ROM 203 and thereby controls the entire functions of the optical disc drive 21. More specifically, the MPU 201 controls the respective functions of the optical disc drive 21 as a rotation control system 211, a coarse-movement control system 213, a pickup control system 215, and a signal processing system 217. The rotation control system 211 is provided for controlling a host interface 209 communicating with the IDE port 113 and controlling rotation of the spindle motor 219. The coarse-movement control system 213 is provided for operating a coarse-movement motor 221 to move the pickup 31 to a position close to a target track on the optical disc 27. The pickup control system 215 is provided for controlling an actuator (not shown) on the pickup 31 to irradiate laser light onto the target track on the optical disc 27. The signal processing system 217 is provided for processing signals read by the pickup 31 from the optical disc 27 to reproduce data and for generating signals to be written to the optical disc 27 based on data sent from the host interface 209.

The flash ROM 203 has recorded therein a device ID 206 unique to the optical disc drive 21 and an R/O status bit 207 representing whether or not read-only (R/O) setting of the optical disc drive 21 is valid. When the R/O status bit 207 states that the R/O setting of the optical disc drive 21, which is normally a rewritable one, is valid, the firmware 205 operates the optical disc drive 21 as being a read-only one. When the host interface 209 receives a read-only setting command from the IDE port 113, the optical disc drive 21 overwrites the R/O status bit 207, whereby the operation of the firmware 205 can be set to a read-only mode. On the other hand, when the host interface 209 receives a read-only release command from the IDE port 113, the optical disc drive 21 overwrites the R/O status bit 207, whereby the operation of the firmware 205 can be set to a rewritable mode. Such function of setting to the read-only mode or the rewritable mode is referred to as a security function of the optical disc drive 21. The firmware 205 includes a timer function. By the timer function of the firmware 205, the read-only setting command and the read-only release command can only be received during a predetermined time after the optical disc drive is powered on and an initialization command is received. The state of the R/O status bit 207 is maintained even after the optical disc drive 21 is powered off. Detailed description of this will be later provided.

Figure 4A:
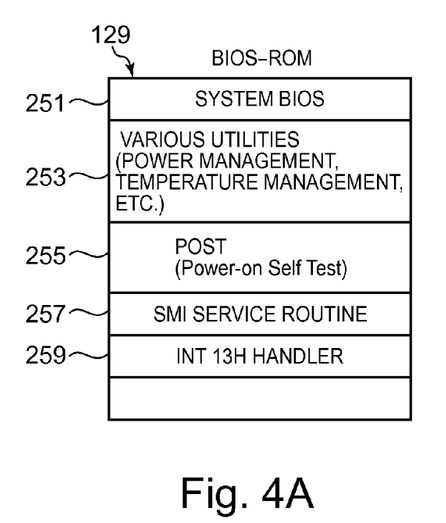
FIGS. 4A to 4C are diagrams showing internal configurations of a BIOS flash ROM, a secure NVRAM and a main memory, respectively, according to an embodiment of the present invention.
Figure 4B:
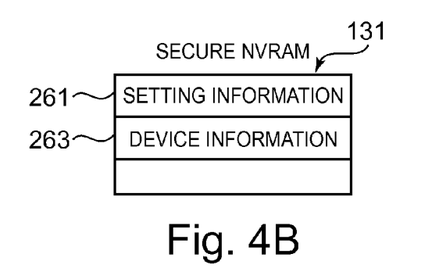
Figure 4C:
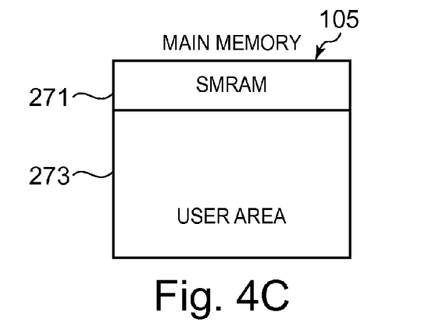

FIGS. 4A to 4C are schematic diagrams illustrating the internal configurations of the BIOS flash ROM 129, the secure NVRAM 131, and the main memory 105. The BIOS flash ROM 129 shown in FIG. 4A is a nonvolatile memory, for which the stored contents are electrically rewritable. The BIOS flash ROM 129 stores therein a system BIOS 251, which is a basic program used for loading and management of a system; various utilities 253, which are software programs for managing the operating environment such as power and temperature; a POST (Power-On Self Test) 255, which is loaded when the notebook PC 10 is powered on, and conducts an initial setting and test of hardware; an SMI service routine 257, which is loaded when the CPU 101 operates in the SMM; and an INT 13H hander 259, which accesses the HDD 121. These program modules stored in the BIOS flash ROM 129 constitute the BIOS. In this embodiment, the POST 255 is configured to perform an operation of setting the optical disc drive 21 to the read-only mode. The program module that sets the read-only mode may be configured separate from the POST 255. When the CPU 101 enters the SMM from the state where it is controlled by the OS, the operation of setting the optical disc drive 21 to the read-only mode is performed by the SMI service routine 257. Detailed description of the above will be later provided.

The secure NVRAM 131 shown in FIG. 4B is a battery backup RAM which is provided for preventing data loss when the notebook PC 10 is powered off, and in which stored contents can be set read/write inhibited by the operation of the system BIOS 251. The secure NVRAM 131 stores therein setting information 261 for the device controllers (the CPU bridge 103 and the I/O bridge 111) of the PC and device information 263, which is information on the devices connected to the device controllers. The setting information 261 mainly includes the loading sequence of the disc drives, drive numbers, a connection method of peripheral devices, parameters related to data transfer, and a POP (Power-On Password). The device information 263 includes a device ID 206 unique to the respective devices connected to the device controllers and internal setting information of the respective devices. The device ID 206 of the optical disc drive 21 connected to the swappable bay 123 and the internal setting information thereof are also included in the device information 263.

The setting information 261 for the optical disc drive 21 connected to the IDE port 113 may have three settings (1) through (3) as follows.

(1) "HIGH"

In this setting, regardless of whether or not the optical disc drive 21 possesses therein a security function, the IDE port 113 to the optical disc drive 21 is invalidated. Thus, the notebook PC 10 cannot detect the presence of the optical disc drive and access to the optical disc drive is completely restricted.

(2) "R/O"

In this setting, when the optical disc drive 21 possessing therein a security function is connected to the IDE port 113, the optical disc drive 21 is set to a read-only mode. When an optical disc drive possessing no security function is connected, the IDE port 113 is invalidated in the same manner as the "HIGH" setting.

(3) "NONE"

In this setting, access from the notebook PC 10 to the optical disc drive 21 connected to the IDE port 113 is not restricted but data are freely accessible. When the optical disc drive 21 set to the read-only mode is mounted, the drive is set to a rewritable mode.

The notebook PC 10 may have one of the three settings (1) through (3) which are set at an assembling stage in a factory based on the user's purpose; however, in this embodiment, a description will be provided by assuming that the notebook PC is provided with the "R/O setting" (2). The setting contents are stored in the secure NVRAM so that the contents can only be accessed by the BIOS.

The main memory 105 shown in FIG. 4C includes a user area 273 used during a normal operation of the notebook PC 10 and an area for an SMRAM (System Management RAM) 271. When the SMI# of the CPU 101 is asserted by hardware, the CPU 101 begins to operate in the SMM and the SMI service routine 257 is called and executed under the control of the system BIOS 251. Since the CPU 101 in the SMM operates in a single tasking, all interrupts are regarded as invalid. Further, since the CPU 101 operating in the SMM can exclusively use the SMRAM 271, the control is not taken over to a task other than the SMI service routine 257. During a period in which the CPU 101 is operating in the SMM, the operation states of the OS immediately before the CPU enters the SMM, the operation states of software operating thereon, and user data are maintained in the user area 273. Also, information representing the register states immediately before the CPU enters the SMM is stored in the SMRAM 271. When the CPU 101 stops operating in the SMM, the CPU 101 is then controlled by the OS and recovers the operation states maintained in the user area 273 based on the register states stored in the SMRAM 271.

Figure 5:
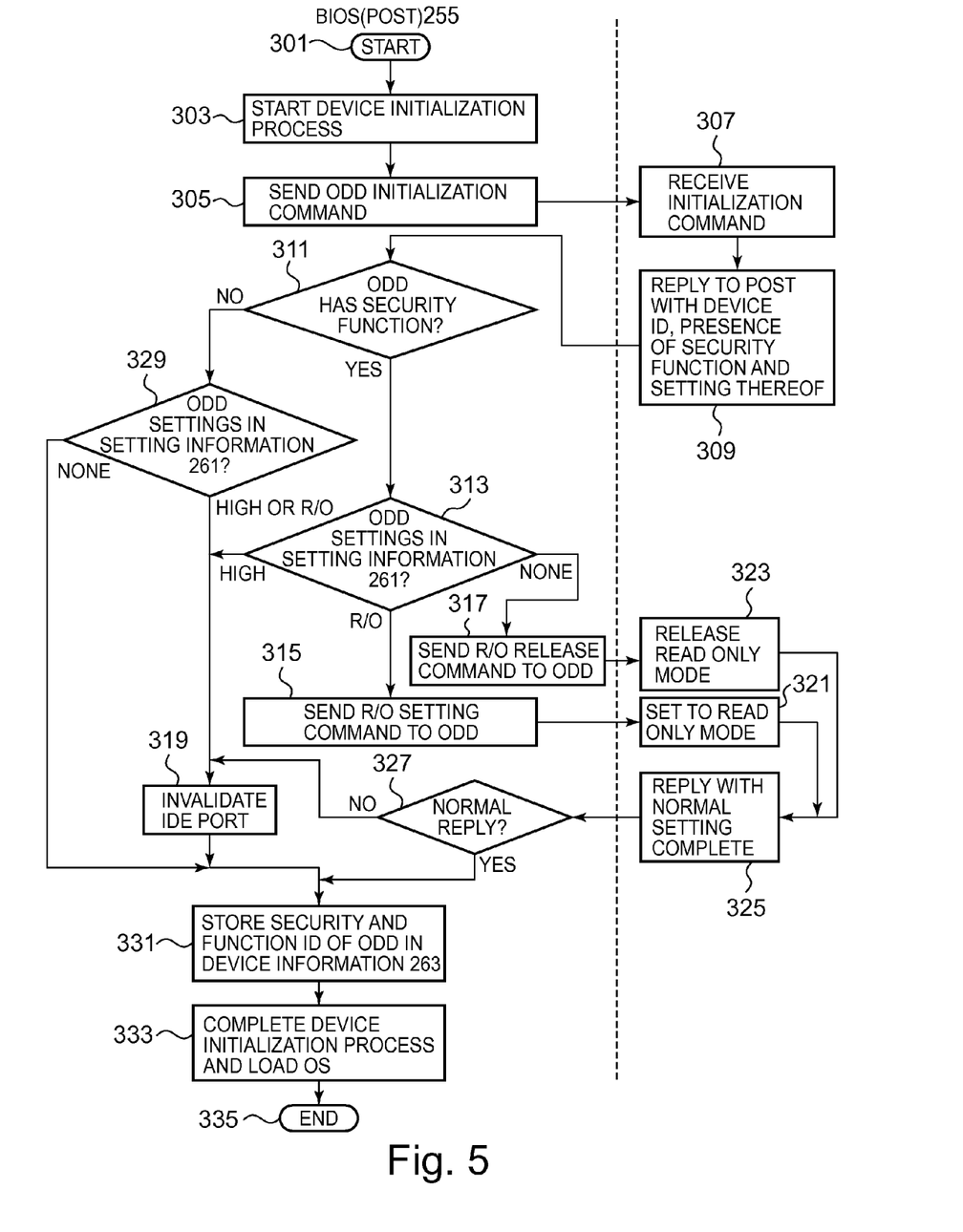

FIG. 5 is a flow chart illustrating processes performed when the optical disc drive 21 is attached to the notebook PC and the notebook PC 10 is powered on. When the notebook PC 10 is powered on, an initial setting process for hardware is initiated by the POST 255 under the control of the system BIOS 251 (Blocks 301 and 303). The POST 255 sends an initialization command to the optical disc drive 21 (Block 305). By the initialization command, the POST 255 refers to the optical disc drive 21 to find the device ID 206 of the optical disc drive 21 and to confirm whether the optical disc drive has a security function that permits the optical disc drive 21 per se to operate in a read-only mode or releases it. The reference for the security function is performed by a vendor command, one of the IDE command, which individual makers can set and use. Since the optical disc drive 21 without the security function does not respond to the vendor command, the POST 255 can determine that the optical disc drive 21 does not have the security function when there is no response to the sent command. Of course, the vendor command is not usually made open.

The optical disc drive 21 having received the initialization command (Block 307) sends a reply to the POST 255 indicating its own device ID 206 and presence of the security function (Block 309). Then, the POST 255 first determines whether or not the optical disc drive 21 possesses the security function based on the reply from the optical disc drive 21 (Block 311). If the optical disc drive 21 possesses the security function, the settings of the optical disc drive 21 included in the setting information 261 is identified (Block 313). If the identified setting is "R/O," the POST 255 sends a command (hereinafter, referred to as "read-only setting command") for setting the optical disc drive to the read-only mode (Block 315). If the identified setting is "NONE," the POST 255 sends a command (hereinafter, referred to as "read-only release command") for releasing the read-only mode of the optical disc drive 21 (Block 317). If the identified setting is "HIGH," the POST 255 invalidates a connecting portion of the IDE port 113 to the optical disc drive 21 (Block 319) and a process of Block 331 is performed.

The optical disc drive 21 having received the read-only setting command sets the optical disc drive per se to operate in the read-only mode (Block 321). The optical disc drive 21 having received the read-only release command releases the setting of the read-only mode set thereto so that it can operate in a rewritable mode (Block 323). The read-only setting command and the read-only release command are the vendor command that is not usually made open. In Blocks 315 and 317, it is preferable to send the read-only setting command and the read-only release command by encoding the commands using the device ID 206 received by the POST 255 as a key. By doing this, it may become difficult to work out a method for releasing the read-only setting by analyzing the optical disc drive 21 or the commands sent from the notebook PC 10 to the optical disc drive 21. The optical disc drive 21 having completed the read-only setting or release replies to the POST 255 by reporting that the command has been normally completed (Block 325). Then, the POST 255 determines whether or not the reply from the optical disc drive 21 reports that the command has been normally completed (Block 327). If it is a normal reply, the process of Block 331 is performed. If it is not a normal reply, the flow moves to Block 319, where the connecting portion of the IDE port 113 to the optical disc drive 21 is invalidated, and the process of Block 331 is performed.

Even when it is determined in Block 311 that the optical disc drive 21 does not have the security function, the settings of the optical disc drive 21 included in the setting information 261 is identified (Block 329). When the identified setting is "R/O" or "HIGH," the flow moves to Block 319, where the POST 255 invalidates the connecting portion of the IDE port 113 to the optical disc drive 21, and the process of Block 331 is performed. When the identified setting is "NONE," the POST 255 performs the process of Block 331. After completion of the above-described processes, the POST 255 stores the device ID 206 of the optical disc drive 21 and information on the presence of the security function determined in Block 311 in the secure NVRAM 131 as the device information 263 (Block 331) and locks the secure NVRAM 131 to inhibit later access. Subsequently, the INT 13H handler 259 is called by the BIOS flash ROM 129 to start the OS (Blocks 333 and 335). The processes related to the security setting of the optical disc drive 21 described with reference to FIG. 5 are performed at any time during processing before the OS is started after the notebook PC 10 is powered on.

Figure 6:
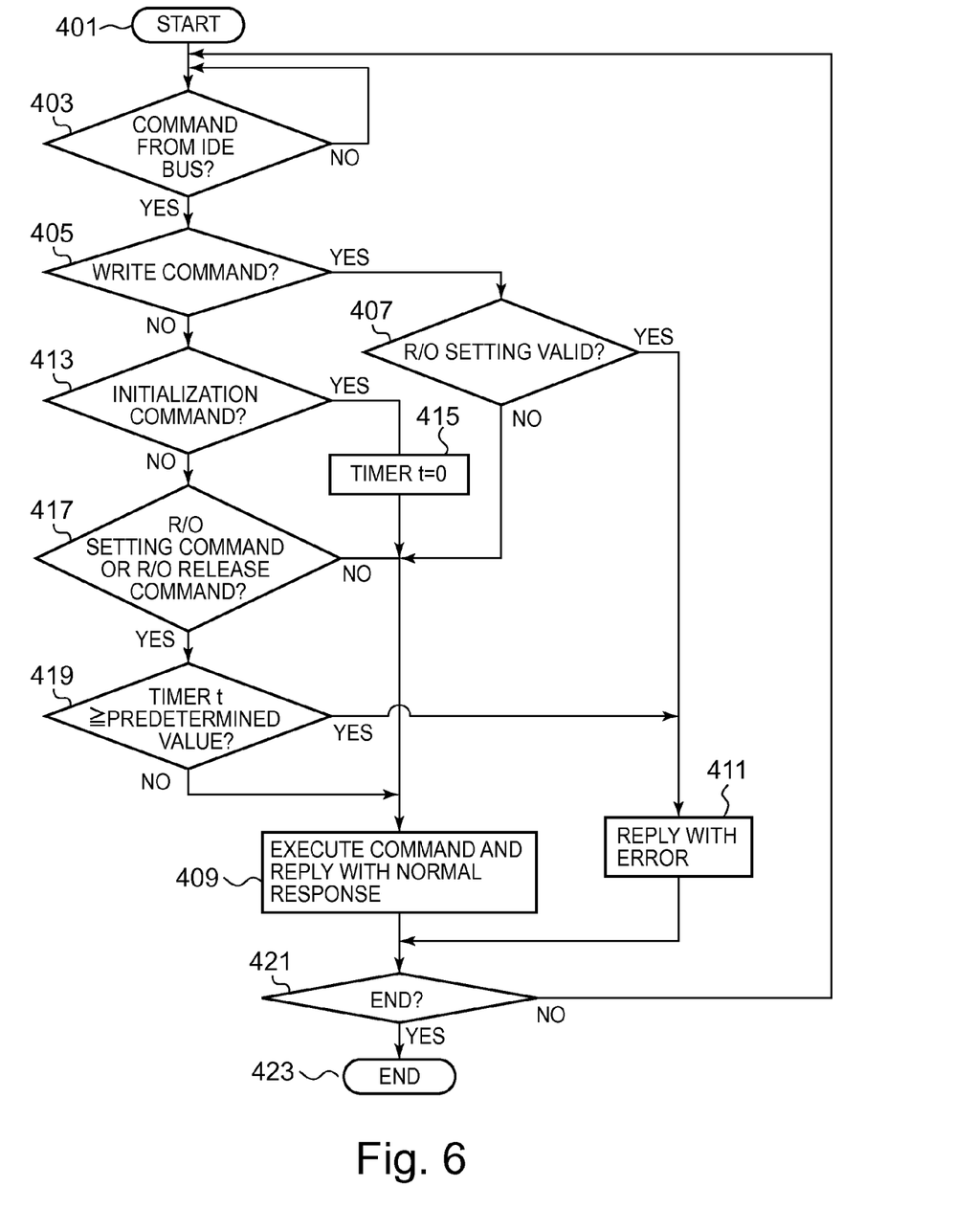
FIG. 6 is a flow chart illustrating processes performed when the optical disc drive has received a command from an IDE port.

FIG. 6 is a flow chart illustrating processes performed by the firmware 205 when the optical disc drive 21 has received a command from the IDE port 113. This flow chart shows the case where the optical disc drive 21 has the security function of the present invention. When the optical disc drive 21 receives any command from the IDE port 113 (Blocks 401 and 403), the firmware 205 first determines whether or not the command is a write command (Block 405). If it is a write command, the firmware 205 reads the R/O status bit 207 to determine whether it is set the read-only setting (Block 407). If it is not the read-only setting, since the optical disc drive 21 operates as a rewritable one, the write command is executed and a normal response is replied to the IDE port 113 (Block 409). If it is the read-only setting, since the optical disc drive 21 operates as a read-only one, the write command is not executed and an error is replied to the IDE port 113 (Block 411).

When it is determined in Block 405 that the received command is not the write command, the firmware 205 determines whether the command is the initialization command sent in Block 305 of FIG. 5 from the BIOS (Block 413). If it is the initialization command, the internal timer function of the firmware 205 is reset and starts counting (Block 415) and the flow moves to Block 409, where a normal response is replied to the IDE port 113. The normal response as used herein includes the device ID 206 and information on the presence of the security function, as shown in Blocks 309 and 311 of FIG. 5.

When it is determined in Block 413 that the received command is not the initialization command, the firmware 205 determines whether the command is either the read-only setting command or the read-only release command (Block 417). If it is neither the read-only setting command nor the read-only release command, the flow moves to Block 409, where the command is executed and a normal response is replied to the IDE port 113. If it is the read-only setting command or the read-only release command, the timer function of the firmware 205 determines whether the elapsed time after reception of the initialization command in Block 415 is within a predetermined time (Block 419). If the predetermined time or more has elapsed after reception of the initialization command, the flow proceeds to Block 411, where without executing the command, an error is replied to the IDE port 113. If the elapsed time after reception of the initialization command is within the predetermined time, the flow proceeds to Block 409, where the read-only setting command or the read-only release command is executed, the status of the R/O statue bit 207 is overwritten, and a normal response is replied to the IDE port 113. The above-described processes are repeated over Blocks 403 to 421 while the optical disc drive 21 continues operating but are stopped when the optical disc drive 21 is powered off (Blocks 421 and 423).

The maximum elapsed time serving as the basis for the determination in Block 419 can be set to a time normally required for completing the processes of FIG. 5 after the notebook PC 10 is powered on. The main idea is to set the maximum elapsed time so that the read-only setting command or the read-only release command set to the optical disc drive 21 should only be received during a period in which the notebook PC 10 is executing the processes of FIG. 5 under the control of the BIOS. By doing this, in a state where the OS is loaded in the notebook PC 10 via the processes shown in FIGS. 5 and 6, even when a command related to security is intercepted and altered via the OS, it is impossible to cancel or change the read-only setting via the optical disc and it is thus safe. There can be several other methods for restricting the releasing of the read-only setting to when the optical disc drive 21 is controlled by the BIOS. For example, once the read-only setting command is received, the optical disc drive 21 may be made unable to receive the read-only release command until the optical disc drive is powered off. Alternatively, separate from the R/O status bit 207, a bit representing as to whether the read-only setting command or the read-only release command has been received may be provided to the flash ROM 203 and the bit may be used for the release restricting method.

If the settings of the optical disc drive 21 included in the setting information 261 is "R/O," the OS started after the optical disc drive 21 is set to the read-only mode may recognize the optical disc drive 21 as being a read-only one by the above-described processes. Therefore, no write command is sent to the optical disc drive 21 via a device controller that controls input/output of data from the OS to the optical disc drive 21. If any application software sends a write command to the optical disc drive via the device driver of the OS, an error is replied to the command by the internal process of the optical disc drive 21 that is set to the read-only mode, as shown in Block 411.

The operation of setting the optical disc drive 21 to the read-only mode is performed at an initial setting step by the control of the BIOS before the OS is started. Therefore, even when another OS different from the OS normally installed in the notebook PC 10 is started, the optical disc drive 21 is already set to the read-only mode by the time the OS is started. Moreover, since a properly encoded command sent by the OS after the end of the time set on the timer is not executed, it is impossible to release the read-only setting. When a consideration is made as to a case where an optical disc drive does not possess the security function wherein the drive can be set to the read-only mode and is connected to the notebook PC 10 and the notebook PC 10 is powered on, if the setting information of the secure NVRAM 131 is "R/O," the connecting portion to the IDE port is invalidated and the optical disc drive cannot be used and it is thus safe. When the setting information of the secure NVRAM 131 is "R/O," it is only possible to use the optical disc drive 21 having the security function of the present invention by setting the drive to the read-only mode.

However, the optical disc drive 21 is connected to the notebook PC 10 via the swappable bay 123. Thus, when the notebook PC 10 is activated in a state where the optical disc drive 21 is removed from the swappable bay 123, the OS can be started without performing the operation of setting the optical disc drive 21 to the read-only mode. When the optical disc drive 21 is connected in a hot swappable manner to the swappable bay 123 after the OS is started, it may be possible to operate the optical disc drive 21 in the rewritable state without performing the read-only setting operation, which is not desirable from the perspective of security. In addition, when an optical disc drive that does not have the security function wherein the drive can be set to the read-only mode is connected in the hot swappable manner, it may be possible to use the optical disc drive without the IDE port being invalidated. In such a case, it cannot be said that the security is sufficiently ensured.

Figure 7:
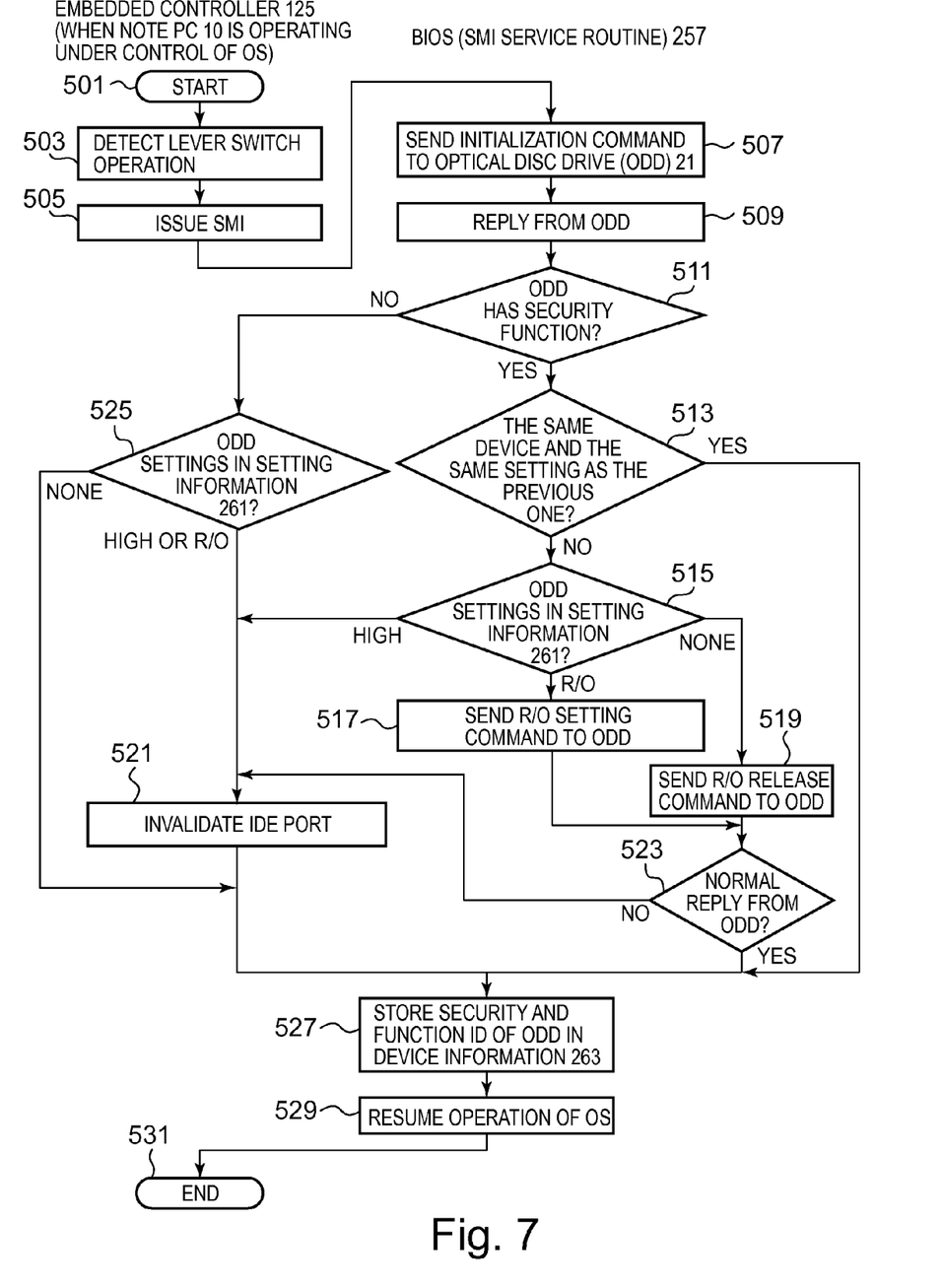
FIG. 7 is a flow chart illustrating processes performed when an optical disc drive is connected in a hot swappable manner to a swappable bay of a notebook PC in which an OS is loaded.

FIG. 7 is a flow chart illustrating processes performed when the optical disc drive 21 is connected in a hot swappable manner to the swappable bay 123 of the notebook PC 10 in which the OS has been started. When the optical disc drive 21 is attached to the swappable bay 123 (Block 501), since the removal lever 33 should be operated, the embedded controller 133 can detect opening/closing of the lever switch 125 (Block 503). In response to the opening/closing of the lever switch 125, the embedded controller 133 makes assertion of the SMI# of the CPU 101 to thereby operate the CPU in the SMM (Block 505) and extends the SMI service routine 257 to the SMRAM 271 to be executed under the control by the system BIOS 251. Since the operation of the embedded controller 133 is independent from the CPU 101, the above processes are performed independent from the OS. Unlike the process by the POST 255 that requires initial settings for the entire hardware, the process by the SMI service routine 257 only requires processing regarding the devices connected to the swappable bay 123.

Similar to the process by the POST 255 in Block 305 of FIG. 5, the SMI service routine 257 sends a device initialization command to the optical disc drive 21 (Block 507). By the device initialization command, the SMI service routine 257 refers to the optical disc drive 21 to find the device ID 206 of the optical disc drive 21 and to confirm whether or not the optical disc drive 21 possesses a security function. The optical disc drive 21 having received the initialization command replies to the SMI service routine 257 with the referred contents in a manner similar to the operations in Blocks 307 and 309.

The SMI service routine 257 having received the reply (Block 509) determines whether the optical disc drive 21 possesses therein the security function (Block 511). If the optical disc drive 21 possesses the security function, the SMI service routine 257 compares the device ID 206 and the security setting of the optical disc drive 21 with information recorded as the device information 263 of the optical disc drive previously connected to the swappable bay 123 (Block 513). If the optical disc drive 21 is the same as the optical disc drive connected at the preceding time and has the same read-only setting, there is no need to perform additional setting and thus the flow moves to Block 527.

When it is determined in Block 513 that the optical disc drive 21 is different from the one connected at the preceding time or has a different read-only setting, the setting of the optical disc drive 21 is identified as to which one of those included in the setting information 261 (Block 515) is it. If the identified setting is "R/O," the SMI service routine 257 sends a read-only setting command to the optical disc drive 21 (Block 517). If the identified setting is "NONE," the SMI service routine 257 sends a read-only release command to the optical disc drive 21 (Block 519). If the identified setting is "HIGH," the SMI service routine 257 invalidates a connecting portion of the IDE port 113 to the optical disc drive 21 (Block 521). Then, it is determined whether the SMI service routine 257 has received a reply from the optical disc drive 21 having received the command in Blocks 517 and 519 and completed the read-only setting or release, the reply reporting that the command has been normally completed (Block 523). If it is a normal reply, the process of Block 527 is performed. If it is not a normal reply, the flow proceeds to Block 521, where the connecting portion of the IDE port 113 to the optical disc drive 21 is invalidated, and the process of Block 527 is performed.

Even when it is determined in Block 511 that the optical disc drive 21 does not possess the security function, the settings of the optical disc drive 21 included in the setting information 261 is identified (Block 525). When the identified setting is "R/O" or "HIGH," the flow proceeds to Block 521, where the SMI service routine 257 invalidates the connecting portion of the IDE port 113 to the optical disc drive 21, and the process of Block 527 is performed. When the identified setting is "NONE," the SMI service routine 257 performs the process of Block 527. After finishing the above-described determination and processes, the SMI service routine 257 stores the device ID 206 of the optical disc drive 21 and information on the presence and setting of the security function in the secure NVRAM 131 as the device information 263 (Block 527) and stops the SMM to resume the operation by the OS (Blocks 529 and 531). The secure NVRAM 131 is locked by the POST 255 before a control is transferred to the OS and is therefore not accessible from the OS or the application software. When the operation by the OS resumes, the OS recognizes a newly connected optical disc drive 21 and a process such as reading of the corresponding device driver is performed.

Even when the optical disc drive 21 is connected in a hot swappable manner to the swappable bay 123, the initialization command is sent in Block 507 after the drive is connected to the swappable bay 123. As shown in FIG. 6, the optical disc drive 21 can receive the read-only setting command or the read-only release command only during a predetermined period after the initialization command is sent. Therefore, the setting is not released by a command at any time after the end of the predetermined period. That is, even when the optical disc drive 21 is connected in a hot swappable manner to the swappable bay 123, since the optical disc drive 21 performs the same operation as that shown in FIG. 6, it is possible to efficiently ensure security.

When the notebook PC 10 is in a suspended (or hibernation) state, power is not supplied to the optical disc drive 21 but the contents stored in the R/O status bit 207 are maintained even after power-off. Therefore, if the R/O status bit 207 were set to the read-only mode before entering the suspended state, the optical disc drive 21 will operate in the read-only mode when the notebook PC 10 resumes its operation. The OS, which was operating in the notebook PC 10, will resume its operation in the previous state before entering the suspended state, while maintaining the recognition and setting of the optical disc drive 21. Even when the optical disc drive 21 was in the state where the read-only release command had been receive at the time when the notebook PC 10 resumes its operation, since the predetermined time of the internal timer function of the optical disc drive 21 has elapsed by the time the OS resumes its operation, no further read-only release command is received, thereby ensuring the security.

If the setting of the R/O status bit 207 cannot be maintained when the optical disc drive 21 is powered off, the same process as the SMI service routine 257 may be executed to set the optical disc drive 21 again to the read-only mode when the notebook PC 10 resumes its operations after the suspended state and the optical disc drive 21 is powered on again. Even in this case, by the time the OS resumes its operation, the optical disc drive 21 will not have received the read-only setting command or the read-only release command by the timer function of the optical disc drive 21.

The operations described above are all performed by hardware and the BIOS (the POST 255 and the SMI service routine 257) and the OS and the application software are not involved in the operations. For this reason, regardless of the type, setting, and the like of the OS, even when another OS different from the OS normally installed in the notebook PC 10 is loaded, the optical disc drive does not operate in the rewritable state if the settings of the optical disc drive 21 included in the setting information 261 is "R/O." Even when the optical disc drive 21 is attached to the notebook PC 10 and is then powered on, or when the optical disc drive 21 is connected in a hot swappable manner to the swappable bay 123, and when an optical disc drive without the security function wherein the drive can be set to the read-only mode, the optical disc drive does not operate in the rewritable state if the settings of the optical disc drive 21 included in the setting information 261 is "R/O."

The present invention has been described with reference to the example of an optical disc drive; however, the present invention can be applied to a rewritable storage unit connected to a PC, such as a hard disc drive or a semiconductor storage unit. In addition, the present invention can be applied to any interface standards capable of connecting a rewritable storage unit to a PC, such as IDE, USB, PCMCIA, CardBus, miniPCI, or Express Card. These storage units may be configured such that a recording medium alone is removable from the PC 10 or that they are removable from the PC 10 integral with a recording medium and a driving unit. What is important to notebook here is that the write inhibit command is sent to the storage unit at a stage where the BIOS is being executed in the PC, that the storage unit is operated in the read-only mode in response to the write inhibit command by the BIOS, and that it is impossible to release the operation of the storage unit in the read-only mode in a state where the OS is in operation. As to a storage unit capable of hot swapping in a state where the OS is in operation, it may be more preferable that hardware on the PC side detects the connection of the storage unit. By doing so, it becomes possible to set the storage unit to the read-only mode by the control of the BIOS independent from the OS and the application software.

In FIGS. 5 and 7, when the settings of the optical disc drive 21 included in the setting information 261 is "HIGH," an operation of invalidating the connecting portion of the IDE port 113 to the optical disc drive 21 was performed (Blocks 319 and 521). Instead, it may be configured such that all the read and write commands sent from the IDE port 113 are not executed within the optical disc drive 21 and an error is replied to the IDE port. In such a case, the optical disc drive 21 needs to be able to perform such operations and the POST 255 and the SMI service routine 257 need to be able to send commands for causing the optical disc drive 21 to perform such operations.

In addition, it is necessary to prevent users from arbitrarily modifying the settings of the optical disc drive 21 included in the setting information 261. In the embodiment described above, the settings are set at the assembling step in a factory. The settings may be set by a supervisor using a supervisor password that only the supervisor can use but other users are not allowed to use.

The present invention has been described with reference to specific embodiments illustrated in the drawings. However, the present invention is not limited to these embodiments, and of course, so long as the effects provided by the present invention are obtained, any kind of well known configuration can be employed.

The present invention can be applied to a computer that uses a rewritable storage unit that is used by being removably attached to the computer.

If not otherwise stated herein, it is to be assumed that all patents, patent applications, patent publications and other publications (including web-based publications) mentioned and cited herein are hereby fully incorporated by reference herein as if set forth in their entirety herein.

What is claimed is:

1. A method comprising:
    setting a security for an optical drive using a program where a control by an operating system of the apparatus is not being performed, said setting further comprising:
    initializing the optical drive;
    receiving a response to the initializing including a device identification and confirming the presence of a security function on the optical drive by the program of an apparatus, wherein the security function provides that the optical drive may be set to one or more of read-only mode and writeable mode, said confirming being performed in a state where a control by an operating system of the apparatus is not being performed;
    when it is determined that the optical drive has the security function, setting the security on the optical drive by the program to a security setting maintained by the program; and
    transferring the control from the program to the operating system
    wherein the security setting is maintained for the optical drive;
    wherein the optical drive executes a security command in a predetermined period of an initialization command being received from the program at the optical drive during execution of a Power-On Self Test.

2. The method of claim 1, wherein the program comprises a BIOS and wherein said confirming the presence of the security function and said setting the security are performed while the BIOS is executing a Power-On Self Test.

3. The method of claim 2, wherein the security function comprises:
    a function that autonomously sets the security by the optical drive; and
    a function that cancels or changes a setting of the security upon receipt of a specific command from the apparatus.

4. The method of claim 3, further comprising the steps of:
    acquiring unique information of the optical drive by the BIOS; and
    encoding the specific command by using the unique information.

5. The method of claim 2, further comprising the step of:
    providing the apparatus with setting information comprising:
        a first setting which completely restricts access to the optical drive;
        a second setting which does not restrict access to the optical drive; and
        a third setting which restricts the optical drive to a read-only mode.

6. The method of claim 5, wherein, when the optical drive is determined to have the security function and the setting information indicates the first setting, the BIOS invalidates an input/output port of the apparatus in relation to the optical drive at the step of setting the security.

7. The method of claim 5, wherein, when the optical drive is determined to possess the security function and the setting information indicates the third setting, the BIOS sets the optical drive to execute the read-only mode at the step of setting the security.

8. The method of claim 5, wherein, when the optical drive is determined to possess the security function and the setting information indicates the second setting, the BIOS permits the apparatus to make non-restricted access to the optical drive at the step of setting the security.

9. The method of claim 5, wherein, when the optical drive is determined to possess no security function and the setting information indicates either the first or the third setting, the BIOS invalidates an input/output port of the computer in relation to the optical drive at the step of setting the security.

10. The method of claim 1, wherein the step of confirming the presence of the security function is performed based on information sent from the optical drive to the apparatus in response to an initialization command sent from the apparatus to the optical drive.

11. A method comprising:
    directing an apparatus to securely set an optical drive to a read-only mode using a program where a control by an operating system of the apparatus is not being performed, said directing further comprising:
    permitting execution of an operating system;
    detecting that the optical drive is connected to the apparatus during the execution of the operating system;
    interrupting control of the operating system and transferring control of the apparatus from the operating system to the program in response to said detecting;
    confirming the presence of a security function on the optical drive by the program of the apparatus, wherein the security function provides that the optical drive may be set to one or more of read-only mode and writeable mode, said confirming being performed in a state where a control by the operating system of the apparatus is not being performed;
    setting the optical drive to a security setting maintained by the program, the security setting being a read-only mode; and
    transferring the control from the program to the operating system wherein the state of being set to the read-only mode is maintained for the optical drive;
    wherein the optical drive executes a security command during interruption of the operating system of the apparatus.

12. An apparatus comprising:
    a recording medium that stores an operating system;
    a nonvolatile memory that stores a a program where a control by an operating system of the apparatus is not being performed;
    a processor capable of switching between and execution of the operating system and the program;
    a connecting portion which establishes a removable connection between an optical drive and the apparatus, the optical drive having a security function providing that optical drive may be set to one or more of read-only mode and writeable mode; and
    a storage section maintained by the program capable of storing setting information for the optical drive;
    wherein, when it is determined that the optical drive is connected to the connecting portion and has the security function, the processor executes the program to initialize the optical drive and sets the optical drive to a read-only mode for the optical drive according to the setting information maintained by the program;

wherein the optical drive executes a security command in a predetermined period of an initialization command being received from the program at the optical drive during execution of a Power-On Self Test.

13. The apparatus of claim 12, wherein the connection portion connects the optical drive to the apparatus via a standardized interface.

14. The apparatus of claim 12, wherein the optical drive is configured to have a construction comprising:
   a recording medium and a driving portion of the optical drive that are integrally detachable from the apparatus; or
   a recording medium of the optical drive that is detachable from the driving portion of the optical drive.

15. The apparatus of claim 12, further comprising:
   a detecting portion that detects that the optical drive unit is connected to the connecting portion during execution of operation of the operating system;
   wherein, when the detecting portion has detected the connection of the optical drive, the processor receives an SMI to transfer control from the operating system to the program, wherein the program is a BIOS, and the optical drive is set to read-only mode.

16. A non-signal program storage device readable by machine embodying a program of instructions executable by the machine to perform acts for setting a security for an optical drive using a program where a control by an operating system of the apparatus is not being performed, said acts comprising:
   initializing the optical drive;
   receiving a response to the initializing including a device identification and confirming the presence of a security function on the optical drive by the program of an apparatus, wherein the security function provides that the optical drive may be set to one or more of read-only mode and writeable mode, said confirming being performed in a state where a control by an operating system of the apparatus is not being performed;
   when it is determined that the optical drive has the security function, setting the security on the optical drive by the program to a security setting maintained by the program; and
   transferring the control from the program to the operating system wherein the security setting is maintained for the optical drive;
   wherein the optical drive executes a security command in a predetermined period of an initialization command being received from the program at the optical drive during execution of a Power-On Self Test.

* * * * *